(12) United States Patent
You et al.

(10) Patent No.: US 12,505,898 B2
(45) Date of Patent: Dec. 23, 2025

(54) MEMORY CONTROLLER MANAGING REFRESH OPERATION AND OPERATING METHOD THEREOF

(71) Applicant: Samsung Electronics Co., Ltd., Suwon-si (KR)

(72) Inventors: Jungmin You, Suwon-si (KR); Eunae Lee, Suwon-si (KR); Sunghye Cho, Suwon-si (KR); Kijun Lee, Suwon-si (KR); Myungkyu Lee, Suwon-si (KR); Kyomin Sohn, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 86 days.

(21) Appl. No.: 18/394,627

(22) Filed: Dec. 22, 2023

(65) Prior Publication Data

US 2024/0249793 A1 Jul. 25, 2024

(30) Foreign Application Priority Data

Jan. 19, 2023 (KR) .......................... 10-2023-0008109

(51) Int. Cl.
*G11C 11/406* (2006.01)
*G11C 11/408* (2006.01)
*G11C 29/52* (2006.01)

(52) U.S. Cl.
CPC ........ *G11C 29/52* (2013.01); *G11C 11/40615* (2013.01); *G11C 11/4085* (2013.01)

(58) Field of Classification Search
CPC .............. G11C 29/52; G11C 11/40615; G11C 11/4085; G11C 11/406; G11C 11/40611; G06F 3/0658; G06F 3/0659
USPC ............................................ 365/185.09, 222
See application file for complete search history.

(56) References Cited

U.S. PATENT DOCUMENTS

| | | |
|---|---|---|
| 9,236,110 B2 | 1/2016 | Bains et al. |
| 11,087,819 B2 | 8/2021 | Cowles et al. |
| 11,410,715 B2 | 8/2022 | Meier et al. |
| 2022/0113868 A1 | 4/2022 | Cowles et al. |
| 2022/0148648 A1 | 5/2022 | Hung |
| 2022/0189535 A1 | 6/2022 | Kim |
| 2024/0112717 A1* | 4/2024 | Rooney ............ G11C 11/40611 |

FOREIGN PATENT DOCUMENTS

KR 102385443 B1 4/2022

* cited by examiner

*Primary Examiner* — Huan Hoang
(74) *Attorney, Agent, or Firm* — Harness, Dickey & Pierce, P.L.C.

(57) ABSTRACT

A memory controller manages a refresh. The memory controller is configured to communicate with a memory device including a memory cell array that include of a plurality of word lines may include a scheduler configured to control commands provided to the plurality of word lines, an error correction code engine that has a register including N entries and is configured to store, in the register, a first parameter which includes address information and active number information of N word lines among the plurality of word lines based on counting the number of actives of the plurality of word lines, a comparator configured to compare the first parameter with a threshold parameter, and a refresh management (RFM) decision circuit configured to determine refresh frequency of the plurality of word lines based on results output from the comparator and to generate an RFM command.

20 Claims, 10 Drawing Sheets

MEMORY CONTROLLER MANAGING REFRESH OPERATION AND OPERATING METHOD THEREOF

CROSS-REFERENCE TO RELATED APPLICATION

This application is based on and claims priority under 35 U.S.C. § 119 to Korean Patent Application No. 10-2023-0008109, filed on Jan. 19, 2023, in the Korean Intellectual Property Office, the disclosure of which is incorporated by reference herein in its entirety.

BACKGROUND

Various example embodiments relate to a memory device and/or an operating method thereof, and more particularly, to a memory controller managing a refresh operation and an operating method thereof.

The density and/or the speed of memory devices widely used in high-performance electronic systems are increasing. When the access frequency of particular memory cells increases in a memory device such as dynamic random access memory (DRAM), adjacent memory cells are stressed, and data retention characteristics of the adjacent memory cells are deteriorated accordingly, resulting in deterioration in data reliability. For example, when a particular row or word line is intensively active, data retention characteristics of memory cells connected to one or more word lines adjacent to the particular word line may deteriorate, and thus target refresh may be performed on the word lines adjacent to the particular word line to secure data reliability. The memory device may include elements for counting the number of actives or accesses of a plurality of word lines to control the target refresh performance.

However, when a care operation such as care refresh is performed by merely counting the number of actives of the word lines, the care operation may be performed without determining the possibility of actual data loss, and thus efficient utilization of memory device resources may be degraded. For example, a situation in which the number of actives of a particular word line increases may occur not only during a normal memory operation, but also may occur due to a malicious attack from the outside.

SUMMARY

Various example embodiments provide a memory controller capable of managing a refresh operation of a memory device based on row hammer information of the memory device, and/or an operating method of the memory controller.

According to some example embodiments, there is provided a memory controller configured to communicate with a memory device including a memory cell array that includes a plurality of word lines, the memory controller including a scheduler configured to control commands provided to the plurality of word lines, an error correction code (ECC) engine having a register including N entries and configured to store, in the register, a first parameter which includes address information and active number information of N word lines among the plurality of word lines based on counting the number of actives of the plurality of word lines, a comparator configured to compare the first parameter with a threshold parameter, and a refresh management (RFM) decision circuit configured to determine a refresh frequency of the plurality of word lines based on results output from the comparator and to generate an RFM command.

Alternatively or additionally according to some example embodiments, there is provided a method of operating a memory controller which communicates with a memory device including a memory cell array including of a plurality of word lines, the method including storing a first parameter which includes address information and active number information of N word lines among the plurality of word lines based on counting the number of actives of the plurality of word lines, comparing the first parameter with a threshold parameter, determining refresh frequency of the plurality of word lines based on a result of the comparing, and generating an RFM command based on the refresh frequency.

Alternatively or additionally, there is provided a memory controller configured to communicate with a plurality of memory devices, the memory controller including a scheduler configured to control commands provided to the plurality of memory devices, an ECC engine having a register including N entries and configured to store, in the register, a first parameter which includes address information and active number information of N memory devices among the plurality of memory devices based on counting the number of actives of the plurality of memory devices, a comparator configured to compare the first parameter with a threshold parameter, and an RFM decision circuit configured to determine refresh frequency of the plurality of memory devices based on results output from the comparator and generating an RFM command.

BRIEF DESCRIPTION OF THE DRAWINGS

Various example embodiments will be more clearly understood from the following detailed description taken in conjunction with the accompanying drawings in which.

DETAILED DESCRIPTION OF VARIOUS EXAMPLE EMBODIMENTS

Hereinafter, embodiments will be described in detail with reference to the accompanying drawings.

Figure 1:
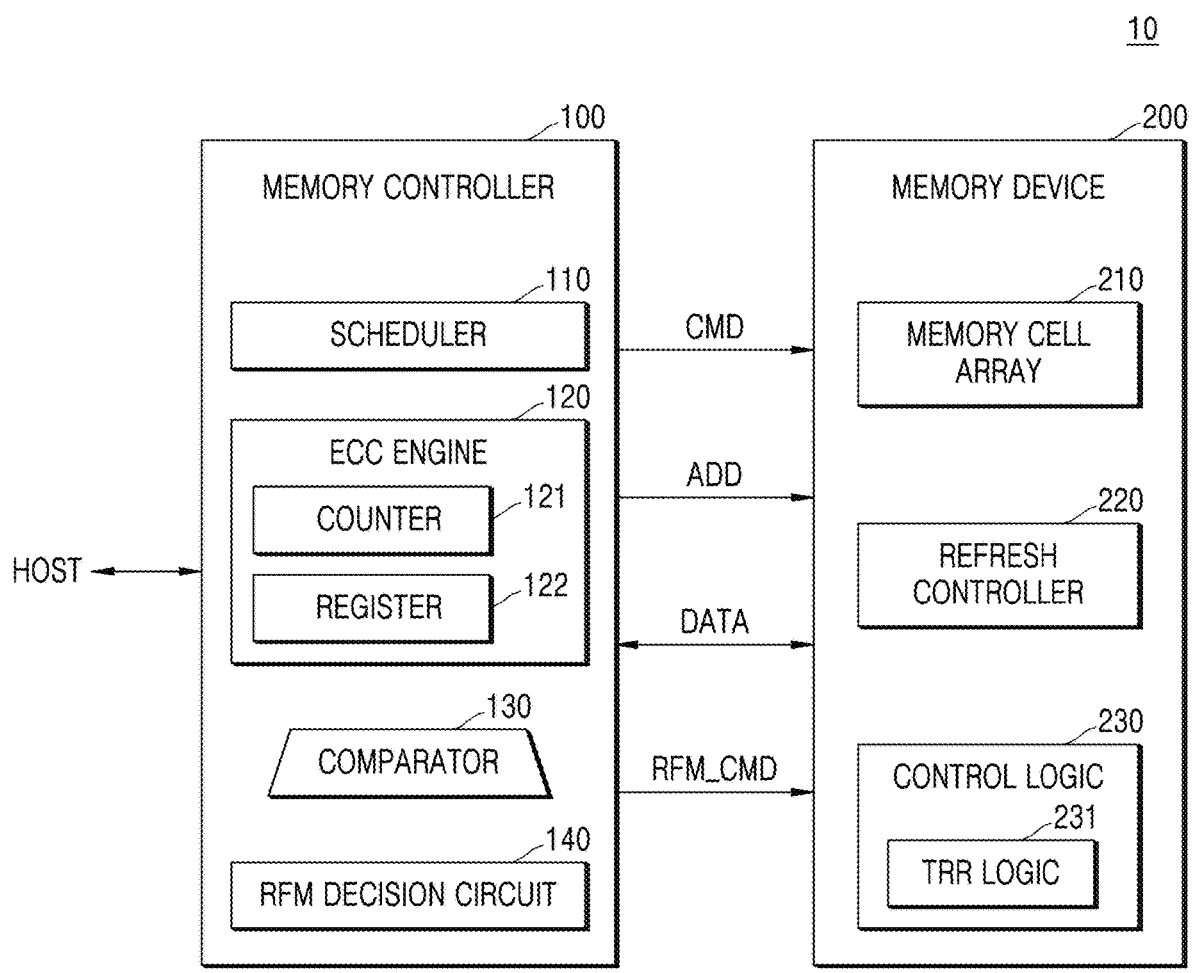
FIG. 1 is a block diagram of a memory system according to some example embodiments.

FIG. 1 is a block diagram of a memory system 10 according to various example embodiments.

Referring to FIG. 1, the memory system 10 may include a memory controller 100 and a memory device 200. The memory controller 100 may include a scheduler 110, an error correction code (ECC) engine 120, a comparator 130, and a refresh management (RFM) decision circuit 140. The memory device 200 may include a memory cell array 210, a refresh controller 220, and control logic 230.

In addition, according to some example embodiments, the ECC engine 120 may include a counter 121 and a register 122. The control logic 230 may include target row refresh (TRR) logic 231. The control logic 230 may further include other elements for controlling memory operations in addition to the TRR logic 231. For example, the control logic 230 may be defined as including various types of elements within the memory device 200.

The memory controller 100 provides various signals to the memory device 200 via an interface circuit to control the memory operations such as writing and/or reading. For example, the memory controller 100 may provide a command CMD and an address ADD to the memory device 200 to access data DATA of the memory cell array 210. The command CMD may include a command for normal memory operations such as data writing and reading, etc. In addition, when the memory device 200 includes a volatile memory device such as a dynamic random access memory (DRAM) cells, the command CMD may include a variety of unique operations related to the DRAM, such as a refresh command to refresh the memory cells, and an RFM command RFM CMD.

The memory controller 100 may access the memory device 200 upon request from an external device such as a host HOST. The memory controller 100 may communicate with the host HOST using one or more of various protocols. The memory cell array 210 may include a plurality of memory cells, and as an example, the memory cell array 210 may include a plurality of word lines and the plurality of memory cells may be connected to each of the word lines. As an example, memory cells connected to one word line may be referred to as a row. For example, the memory cell array 210 may include a plurality of rows. Performing refresh on a word line in describing some example embodiments may refer to performing refresh on memory cells (or a row) that are connected to one word line, and thus the phrases "refresh on a word line" and "refresh on a row" may be used interchangeably.

A scheduler 110 may perform scheduling of a normal refresh operation and a target refresh operation. For example, the scheduler 110 may control or schedule commands provided to the memory device 200.

The ECC engine 120 may perform logic operations to determine a weak or defective address or cell assigned to an address. As an example, the ECC engine 120 may include a counter 121 for counting the number of actives (or activations or accesses) of the plurality of word lines, and may include a register 122 for storing active number information related to the number of actives (or activations or accesses) of each word line, for example, in the form of a table. Alternatively or additionally, the ECC engine 120 may perform logic operations for determining one or more defective memory devices. The ECC engine 120 may include the counter 121 for counting the number of actives (or activations or accesses) of a plurality of memory devices, and may include the register 122 for storing active number information related to the number of actives of each of the memory devices in the form of a table.

For example, the counter 121 may count a first parameter rolling accumulated active RAA which is or corresponds to the number of actives of the plurality of word lines. The register 122 may store active number information related to the number of actives or activations or accesses of each word line in the form of a table. Alternatively or additionally, the counter 121 may count the first parameter RAA, which is or corresponds to the number of actives of the plurality of memory devices, and the register 122 may store the active number information related to the number of actives of the memory devices in the form of a table.

Based on a result of counting the number of actives or accesses of the plurality of word lines, the ECC engine 120 may determine the most active word line for a particular period (such as a dynamically determined, or, alternatively, a preset period), and may determine a location of one or more weak word lines adjacent to the most active word line. However, example embodiments are not necessarily limited thereto, and elements for determining a weak word line may be variously implemented within the memory controller 100.

The comparator 130 may perform an operation of comparing the number of actives of the memory device 200 with a threshold number, and may perform a setting operation on the RFM decision circuit 140 based on the comparison result. The threshold number may be dynamically determined, or, alternatively, predetermined.

A row hammer may correspond to rapid and repeated access or activation of a row or a word line within the DRAM. A row hammer may result in data loss, e.g., from neighboring rows adjacent to the row suffering the row hammer. According to various example embodiments, the RFM decision circuit 140 may detect the degree of row hammer of the memory device 200 based on information provided from the ECC engine 120 or the comparator 130, and may output the RFM command RFM CMD including the row hammer information indicative thereof.

In some example embodiments, the RFM decision circuit 140 may determine an operating state and/or an operating pattern of the memory device 200 based on output information from the ECC engine 120, and based thereon, may detect row hammer related to the possibility of data loss in the memory device 200 to output the RFM command RFM CMD accordingly.

In some example embodiments, based on a counting operation of an output counter circuit of the ECC engine 120 during a dynamically determined period (or, alternatively, preset period), information on the number of outputs performed on entries during the preset period may be provided to the RFM decision circuit 140.

In some example embodiments, the row hammer information of the memory device 200 may be detected by comparing the number of previous outputs with the number of current outputs. For example, the row hammer information may be updated so that it rises or falls over time. For example, the RFM decision circuit 140 may selectively provide the RFM command RFM CMD according to the number of or the output frequency of the row hammer information of the memory device 200.

In addition, since the degree of row hammer for a relatively short period and that for a relatively long period may be detected, a care operation considering the period in which row hammer is determined may be performed. For example, when row hammer of the memory device 200 is greatly increased in a relatively short period, a control operation temporarily delaying or skipping or inhibiting a memory operation (e.g., an operation including active) may be performed, thereby reducing the frequency of frequent outputs of the entries. Alternatively or additionally, when row hammer of the memory device 200 is greatly increased in a relatively long period, a control operation, e.g., setting a refresh period to be short may be performed, thereby improving the overall data retention characteristic for a long period of time.

An operating method of components included in the memory controller 100 will be described in detail with reference to FIG. 3 described below.

For example, the output frequency of entries may increase when the word lines of the memory device 200 are frequently active or activated, wherein a possibility that data of a weak word line requiring target refresh is flipped may increase as active number information of word lines stored in entries is lost. Alternatively or additionally, although the possibility of flipping data may be relatively low when the active of the word lines is frequently performed while the memory device 200 normally operates, the data retention characteristic of the weak word line may be intentionally, e.g., maliciously, degraded, and accordingly, there is a high possibility that data of the weak word line is flipped when the word lines are frequently active and the output frequency of entries increases due to an external malicious attack.

When any one word line in the memory device 200 is active (or accessed) intensively and/or frequently, the memory cells of a word line (hereinafter referred to as a weak word line) located adjacent to (or immediately neighboring) the intensively active word line may be subjected to electromagnetic interference, and in particular, a degree of interference experienced by the weak word line may increase as the integration degree of the memory device 200 increases. Accordingly, the data of the memory cells connected to the weak word line is more likely to be flipped, and target refresh may be performed on the weak word line for a dynamically determined period or preset period and/or aperiodically to help ensure the reliability of the data in response to the above phenomenon.

Alternatively or additionally, the plurality of word lines in the memory cell array 210 may have a structure in which the plurality of word lines are arranged, and two word lines located adjacent to both sides of an intensively accessed word line, respectively, may correspond to weak word lines. Alternatively or additionally, in some example embodiments, as at least two word lines adjacent to the intensively accessed word line on one side correspond to the weak word lines, three or more weak word lines may be targeted with refresh with respect to the intensively accessed word line.

The refresh controller 220 may perform refresh on the word lines (or rows) of the memory cell array 210 in response to a refresh command from the memory controller 100. Alternatively or additionally, the refresh controller 220 may refresh the word lines of the memory cell array 210 in a self-refresh mode, without intervention by the memory controller 100. Alternatively or additionally, according to some example embodiments, when a particular word line is intensively accessed, the refresh controller 220 may control a target refresh operation on one or more weak word lines adjacent to the intensively accessed word line based on control of the control logic 230.

In some example embodiments, the TRR logic 231 may perform logic operations to determine the weak address. As an example, the TRR logic 231 may include a counter for counting the number of actives or activations or serial actives of the plurality of word lines, and, based on a result of counting the number of actives of the plurality of the word lines, may determine the most active word line for a particular period, e.g., a preset period, and determine the location of one or more weak word lines adjacent to the most active word line. In addition, the address information of the determined weak word lines may be provided to the refresh controller 220. However, example embodiments are not necessarily limited thereto, and elements for determining a weak word line may be variously implemented within the memory device 200, e.g., outside the control logic 230.

The refresh controller 220 may include a circuit (e.g., an address counter) for generating a normal address that indicates the word line on which the normal refresh operation is to be performed, and may control the normal refresh operation and the target refresh operation based on the normal address and the address information of the weak word line from the control logic 230. For example, the normal refresh operation and the target refresh operation may be selectively performed in response to a refresh command from the memory controller 100.

According to some example embodiments, the TRR logic 231 may include a register for storing the address information of word lines and the active number information related to the number of actives of each word line in the form of a table. In addition, a counter circuit for counting the number of actives of word lines may be provided outside or inside the TRR logic 231, and the active number information based on the counting result of the counter circuit may be stored in the register of the TRR logic 231.

The register of the TRR logic 231 may include a plurality of entries, and each entry may store address information and active number information of a word line. In some example embodiments, the number of entries may be less than the number of word lines included in the memory cell array 210, so that the address information and the active number information of some of the word lines provided in the memory cell array 210 may be stored in the register of the TRR logic 231. One or more pieces of information in the register of the TRR logic 231 may be provided to the memory controller 100. In some example embodiments, the characteristics of information that may be provided by the TRR logic 231 are not necessarily limited to a particular form.

The memory device 200 may be or may include dynamic random access memory such as one or more of double data rate synchronous dynamic random access memory (DDR SDRAM), low power double data rate (LPDDR) SDRAM, graphics double data rate (GDDR) SDRAM, Rambus® dynamic random access memory (RDRAM®), and/or the like. However, example embodiments are not necessarily limited thereto, and as an example may be applied to a memory device that performs a data retention operation corresponding to refresh, as non-volatile memory, such as one or more of magnetic RAM (MRAM), ferroelectric RAM (FeRAM), phase-change RAM (PRAM), and resistive RAM (ReRAM).

The memory device 200 may be a single memory chip or a semiconductor package including two or more memory chips. Alternatively or additionally, the memory device 200 may be a memory module in which a plurality of memory chips are mounted on a module board. Alternatively, although the memory controller 100 and the memory device 200 are shown as being separate from each other in FIG. 1, the memory device 200 may be implemented as a memory system in which some or all of a memory control function and a memory cell array are integrated in a single semiconductor package.

Alternatively or additionally, in some example embodiments, the degree of row hammer may be determined through various methods based on the active of the word lines, and, as an example, the degree of row hammer may be determined based on counting the total number of actives for a particular, e.g., for a preset period and/or counting the number of active word lines for a particular, e.g., for a preset period, wherein the information used for determining low hammer according to some example embodiments may be defined as information related to the active frequency.

Figure 2:
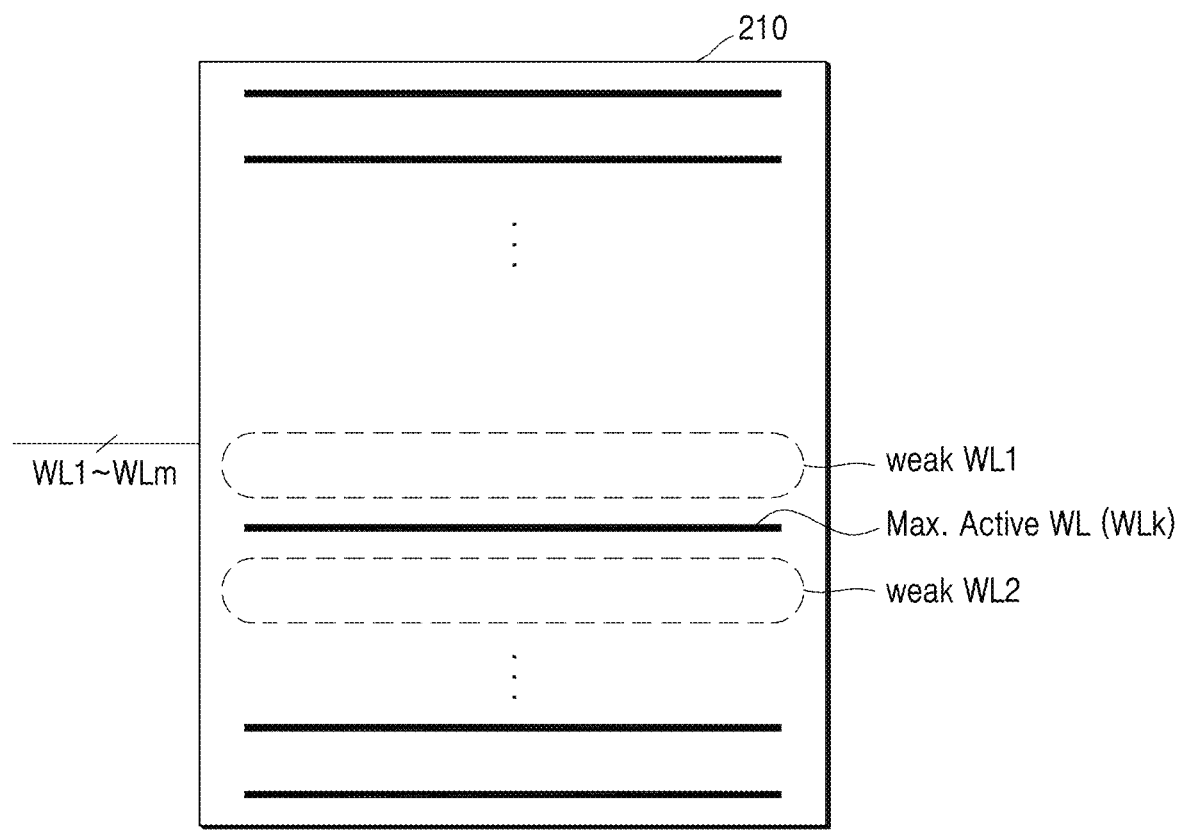
FIG. 2 is a diagram illustrating an example of determining a weak word line based on the number of actives of word lines.

FIG. 2 is a diagram illustrating an example of determining a weak word line based on the number of actives of word lines.

As an example, the operations of counting the number of actives and determining a weak word line may be performed based on the operations of the TRR logic 231 of FIG. 1.

Referring to FIGS. 1 and 2, the memory cell array 210 may include a plurality of rows or word lines WL1 to WLm, and based on a result of counting the number of actives of the plurality of word lines WL1 to WLm for a particular or preset period, the most active word line from among the plurality of word lines WL1 to WLm may be determined. Assuming that the $k_{th}$ word line WLk is the most active word line, at least one of the word lines adjacent to the $k_{th}$ word line may be greatly subjected to electromagnetic interference, and thus may correspond to a weak word line. In some example embodiments, the $k_{th}$ word line WLk may be in a middle of a subarray, in which case there may be up to two weak word lines WL1 and WL2 In some example embodiments, the $k_{th}$ word line WLk may be at an edge of a subarray, in which case there may be one neighboring word line that may be a weak word line (e.g., WL1 or WL2).

The weak word lines may be located on both sides of the $k_{th}$ word line WLk, and as an example, at least one weak word line located on one side of the $k_{th}$ word line WLk may be referred to as a first weak word line weak WL1, and at least one weak word line located on the other side of the $k_{th}$ may be referred to as a second weak word line weak WL2. In performing target refresh, the target refresh may be performed on the first weak word line weak WL1 and the second weak word line weak WL2 for a particular (e.g., preset) period.

According to various example embodiments, as the number of entries of the register provided in the TRR logic 231 is less than the number of the plurality of word lines WL1 to WLm, the address information of some of the word lines WL1 to WLm and the corresponding active number information may be stored in the entries. As the active number information on at least some word lines among the plurality of word lines WL1 to WLm is deleted from the register, the accuracy of the information counting the number of actives of the word lines may be lowered, which may be a factor of lowering the reliability of data.

On the other hand, according to various example embodiments, the output frequency of the information of the entries may be determined based on the operation of the TRR logic 231, and the row hammer information of the memory device 200 may be detected based on determination of the output frequency, thereby improving the reliability of the data through the care operation on the memory device 200 according to the degree of the detected row hammer.

Figure 3:
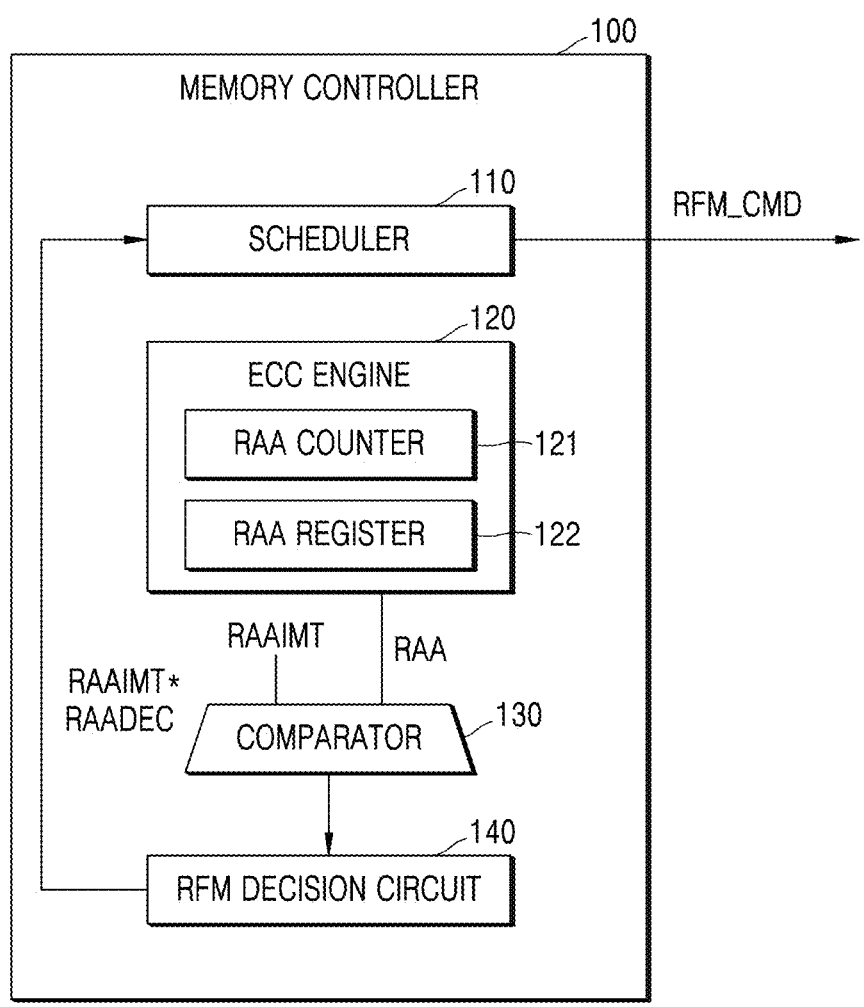
FIG. 3 is a block diagram illustrating an implementation of a memory controller of FIG. 1.

FIG. 3 is a block diagram illustrating an implementation of the memory controller 100 of FIG. 1.

Referring to FIGS. 1 and 3, the comparator 130 may perform an operation of comparing the number of actives or activations of the memory device 200 with a threshold number, and may perform a setting operation on the RFM decision circuit 140 based on the comparison result. For example, the comparator 130 may compare a first parameter RAA that is or is based on the number of actives of the memory device 200 with a threshold parameter RAAIMT (RAA initial management threshold) which is a threshold number. The comparator 130 may multiplex and output the first parameter RAA and the threshold parameter RAAIMT. In some example embodiments, depending on a selection signal, the comparator 130 may selectively output either the first parameter RAA or the threshold parameter RAAIMT. Although not shown in FIG. 1, the row hammer information output from the comparator 130 may be provided to various elements in the memory device 200 (e.g., refresh controller, etc.).

The comparator 130 may set the RFM decision circuit 140 so as to provide the RFM command RFM CMD when the first parameter RAA is greater than the threshold parameter RAAIMT. Conversely, the comparator 130 may set the RFM decision circuit 140 so as not to provide the RFM command RFM CMD when the first parameter RAA is less than the threshold parameter RAAIMT.

The RFM decision circuit 140 may feed back a quantity such as RAAIMT*RAADEC to the scheduler 110, wherein the RAAIMT*RAADEC may schedule a command provided to the memory device 200 by subtracting the RAA parameter by decreasing the RAA parameter, which is the first parameter output by the ECC engine 120.

As described above, the memory controller 100 may manage the number of refresh operations per weak word line of the memory cell array 210 by providing the RFM command RFM CMD to the memory cell array 210. For example, the memory cell array 210 which is provided with the RFM command RFM CMD may perform additional refresh operations, and the memory cell array 210 which is not provided with the RFM command RFM CMD may not perform additional refresh operations. Alternatively or additionally, as the number of actives of the plurality of word lines of the memory cell array 210 increases, the refresh frequency of the memory cell array 210 may increase. As the refresh frequency increases, the refresh operation of the plurality of word lines may increase. Then, the supply period of the RFM command RFM CMD may be changed based on the refresh frequency.

Figure 4:
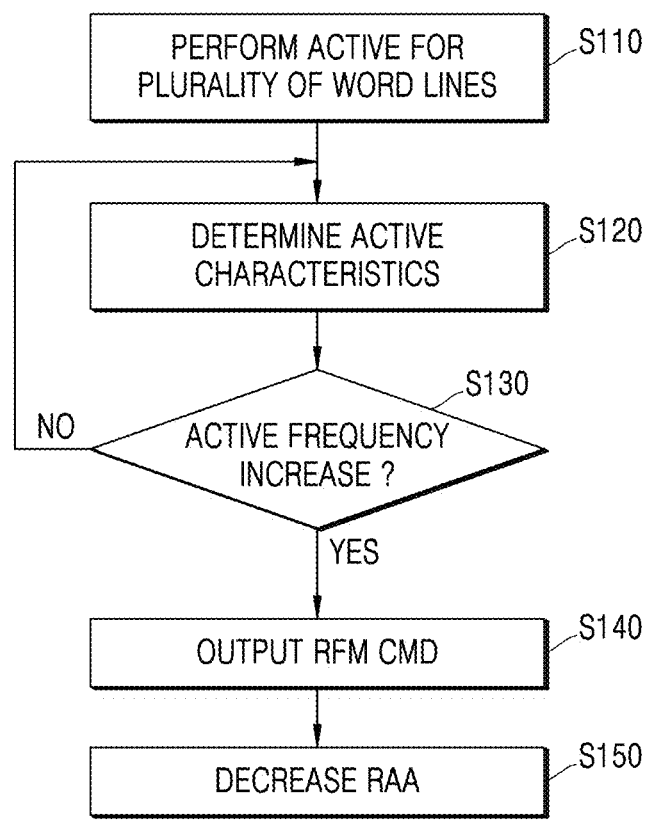
FIGS. 4 and 5 are flowcharts illustrating a method of operating a memory controller according to some example embodiments.
Figure 5:
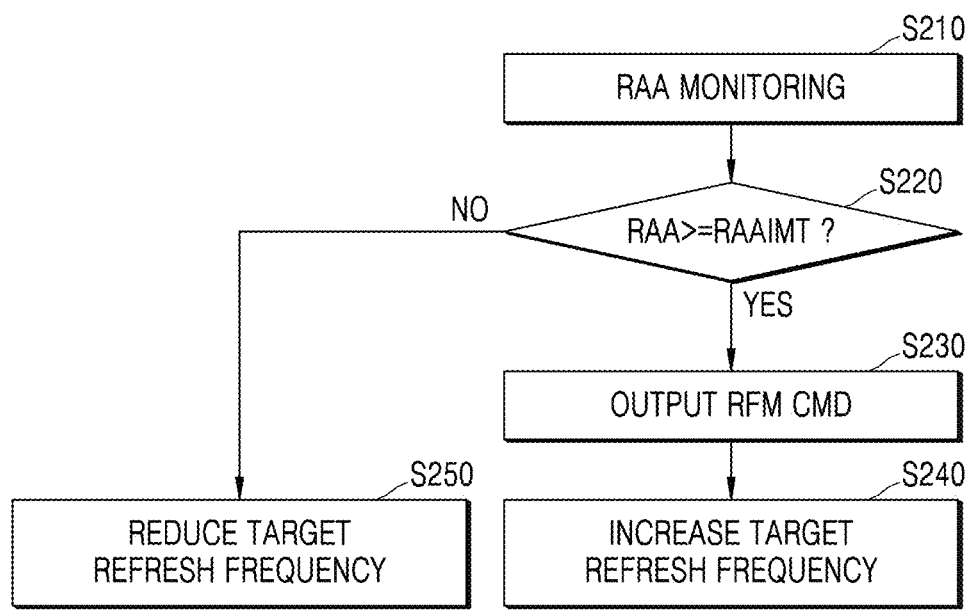

FIGS. 4 and 5 are flowcharts illustrating a method of operating a memory controller according to some example embodiments.

A subject performing each of the operations of FIGS. 4 and 5 may be a memory device or a memory controller (or an application processor).

Referring to FIG. 4, as various memory operations are performed on the memory device, an active operation or an activation operation may be performed on a plurality of word lines (S110), and the memory controller and/or a counter circuit provided in the memory device may count the number of actives of the plurality of word lines. In addition, a register provided in the memory controller or the memory device may include a plurality of entries, and address information and active number information of some word lines among the plurality of word lines provided in the memory device may be stored in the entries.

One or more periods for determining the row hammer of the memory device may be defined, and, for example, the active characteristic of the plurality of word lines may be determined (S120). The active characteristic may be a criterion for determining an operating pattern and/or an operating characteristic of the memory device, and may be or may be based on, for example, a total number of actives performed for a particular, e.g., dynamic period or preset period. Alternatively or additionally, the active characteristic may be defined as or be based on the number of word lines that have been active at least once for a preset period. Hereinafter, the active characteristic is described as corresponding to the active frequency.

It may be determined whether the active frequency has increased (S130), and when the active frequency has increased, an RFM command may be output/generated (S140). On the other hand, when the active frequency does not increase (S130, NO), the active characteristic may be determined again. The output/generated RFM command may be provided to the memory device, and may be utilized within the memory controller.

When the RFM command is output (S140), the memory controller may decrease the RAA parameter (S150).

Referring to FIG. 5, the memory controller may monitor the first parameter RAA (S210). The comparator may compare whether the first parameter RAA is greater than the threshold parameter RAAIMT (S220). When the first parameter is greater than or equal to the threshold parameter (S220, YES), the RFM command may be output (S230). Conversely, when the first parameter is less than the threshold parameter (S220, NO), the target refresh frequency may be reduced (S250).

When the RFM command is output, the memory controller may increase the target refresh frequency of the memory device (S240).

Figure 6:
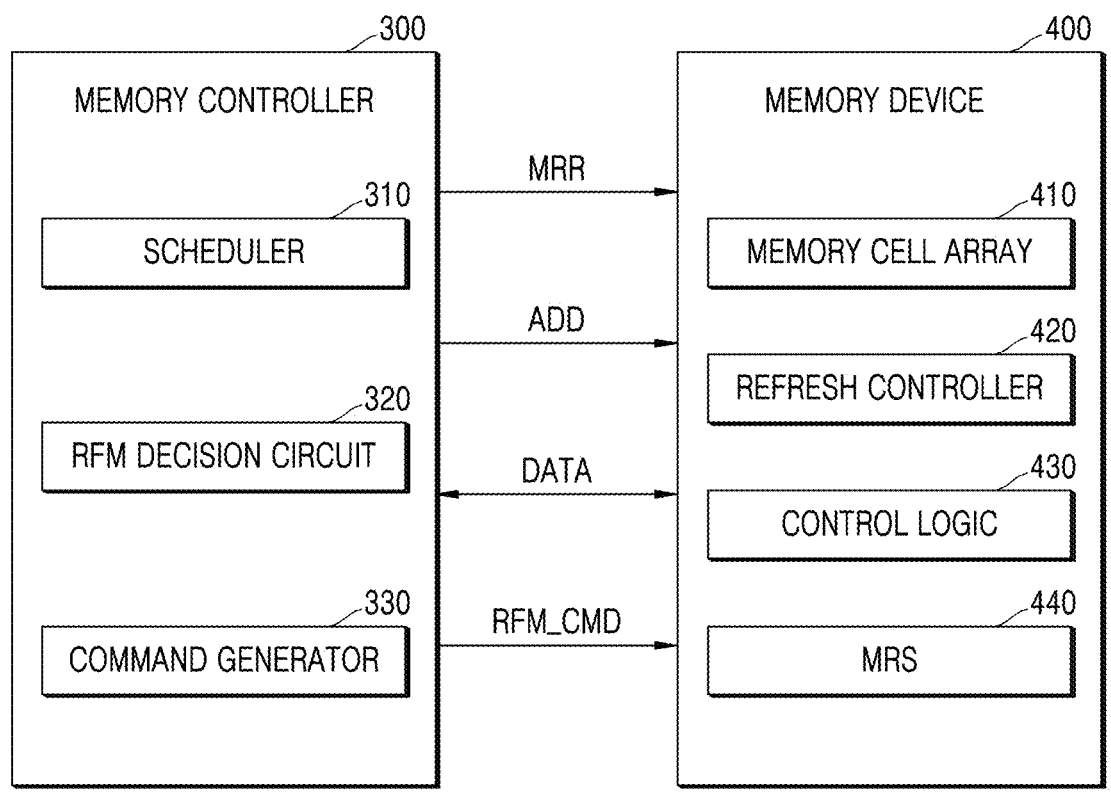
FIG. 6 is a block diagram of a memory system according to some example embodiments.

FIG. 6 is a block diagram of a memory system 20 according to various example embodiments.

Referring to FIG. 6, the memory system 20 may correspond to the memory system 10 shown in FIG. 1. The memory system 20 may include a memory controller 300 and a memory device 400, wherein the memory controller 300 may include a scheduler 310, an RFM decision circuit 320, and a command generator 330. In addition, the memory device 400 may include a memory cell array 410, a refresh controller 420, control logic 430, and a mode register 440. Although not shown in FIG. 7, the memory device 400 may further include a weak word line detector according to some example embodiments described above.

In some example embodiments, the memory controller 300 may be or may correspond to a component included in an application processor, and the application processor may be implemented as a system on chip (SoC). The SoC may include a system bus (not shown) to which a protocol having a preset standard bus specification is applied, and may include various intellectual properties (IPs) connected to the system bus. As a standard specification of the system bus, an advanced microcontroller bus architecture (AMBA) protocol from Advanced RISC Machine (ARM) may be applied. The bus type of the AMBA protocol may include one or more of an advanced high-performance bus (AHB), an advanced peripheral bus (AB), an advanced extensible interface (AXI), AXI4, AXI coherency extensions (ACE), and the like. In addition, other types of protocols such as SONICs Inc.'s uNetwork, IBM's CoreConnect, and OCP-IP's Open Core Protocol may be applied.

According to some example embodiments described above, the RFM decision circuit 320 may determine the refresh frequency or period according to the row hammer information. The memory controller 300 may change the refresh period for the memory device 400 according to the row hammer information and/or the RFM command RFM CMD. For example, the command generator 330 may output the changed RFM command RFM CMD according to the row hammer information.

Although not shown in FIG. 6, in some example embodiments, based on a result of determining the number of actives of the plurality of word lines, a weak word line determiner may determine the most active word line for a particular, e.g., preset period, and may determine a location of one or more weak word lines adjacent to the most active word line. In addition, information related to the determined weak word lines may be provided to the refresh controller 420. However, example embodiments are not necessarily limited thereto, and elements for determining a weak word line may be variously implemented within the memory device 400, e.g., outside the control logic 430.

According to various example embodiments described above, the row hammer information generated by the memory device 400 may be stored in the mode register set (MRS) 440. The command generator 330 of the memory controller 300 may output a mode register read command MRR to the memory device 400 to read information stored in the mode register 440, and may receive the row hammer information in response thereto. In some example embodiments, the row hammer information may be transmitted via a data DATA channel between the memory controller 300 and the memory device 400.

Figure 7:
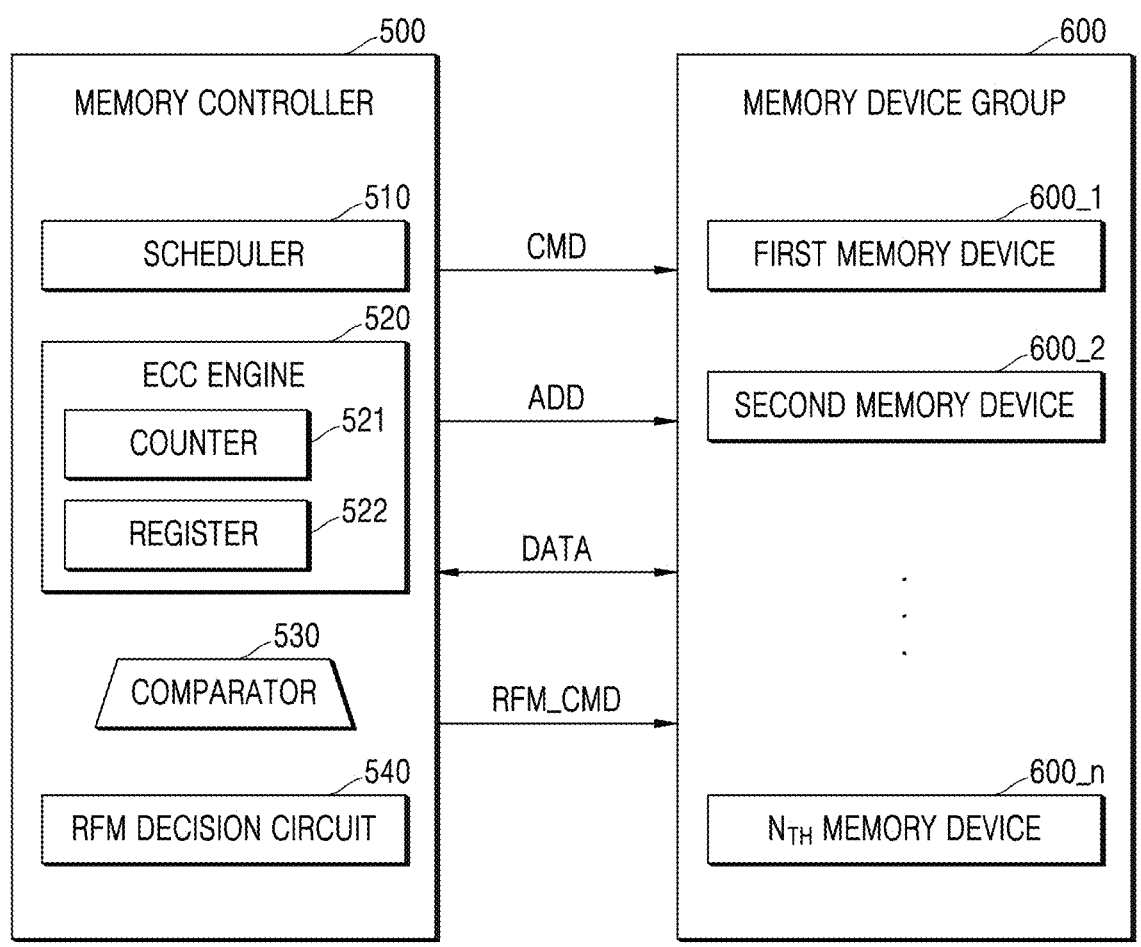
FIG. 7 is a block diagram of a memory system according to some example embodiments.

FIG. 7 is a block diagram of a memory system according to some example embodiments. The content overlapping with FIG. 1 may be omitted for brevity.

Referring to FIG. 7, the memory system 30 may correspond to the memory system 10 shown in FIG. 1. The memory system 30 may include a memory controller 500 and a memory device group 600. The memory device group 600 may include a first memory device 600_1, a second memory device 600_2, and an $n_{th}$ memory device 600_n.

FIG. 7 illustrates the memory system 30 capable of managing the number of refresh operations of a plurality of memory devices, while FIG. 1 illustrates the memory system 10 capable of managing the number of refresh operations of a plurality of word lines of one memory device.

Since the memory controller 500 may manage the number of refresh operations of the first memory device 600_1, the second memory device 600_2, and the $n_{th}$ memory device 600_n based on the row hammer information of the first memory device 600_1, the second memory device 600_2, and the $n_{th}$ memory device 600_n, it is possible to determine and cope with a situation in which there is a possibility of actual data loss in the memory device.

As described above, the memory controller 500 may manage the number of refresh operations of the first memory device 600_1, the second memory device 600_2, and the $n_{th}$ memory device 600_n, by providing the RFM command RFM CMD to the first memory device 600_1, the second memory device 600_2, and the $n_{th}$ memory device 600_n. For example, the first memory device 600_1 that is provided with the RFM command RFM CMD may perform additional refresh operations, and the second memory device 600_2 and the $n_{th}$ memory device 600_n that are not provided with the RFM command RFM CMD may not perform additional refresh operations.

Figure 8:
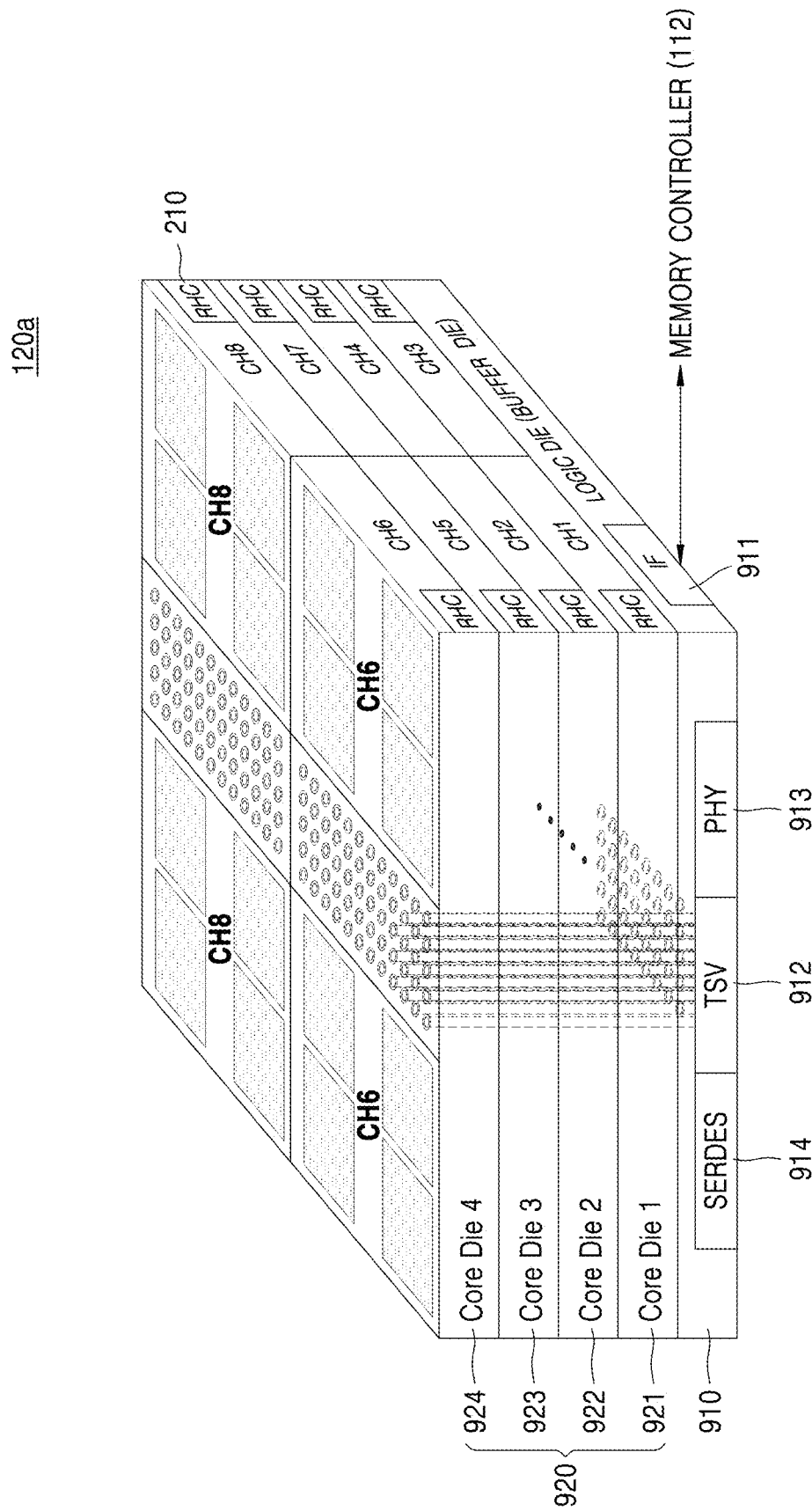
FIG. 8 is a diagram of a memory device including a row hammer circuit according to some example embodiments.

FIG. 8 is a diagram of a memory device including a row hammer circuit according to some example embodiments.

Referring to FIG. 8, the row hammer control circuit RHC may be included inside the memory device, but is not limited thereto, and may also be included outside the memory device or inside the memory controller.

The memory device 200 of FIG. 1 implemented as high bandwidth memory (HBM) is shown. It should be noted that the HBM configuration shown in FIG. 8 is provided as an example and is not necessarily an actual HBM configuration. In addition, the HBM configuration shown in FIG. 8 as an example does not represent or imply limitations to the inventive concept. Hereinafter, suffixes (e.g., a in 120a) attached to the same reference numerals in different drawings are for distinguishing a plurality of circuits having similar or identical functions. For convenience of description, the memory device may be used interchangeably with the HBM 120a.

The HBM 120a may be connected to an external device or a host device via the HBM protocol of the joint electron device engineering council (JEDEC) standard. The HBM protocol is or includes or is included in a high performance random access memory (RAM) interface for three-dimensional stacked memories (e.g., DRAM). The HBM 120a generally achieves greater bandwidth while consuming less power in a substantially smaller form factor than other DRAM technologies (e.g., DDR4, GDDR5, etc.).

The HBM 120a may have a high bandwidth by including a plurality of channels CH1 to CH8 having interfaces independent of each other. The HBM 120a may include a plurality of dies 910 and 920, e.g., a logic die (or a buffer die) 910 and one or more core dies 920 stacked on the logic die 910. In FIG. 8, the first to fourth core dies 921 to 924 are provided in the HBM 120a, but the number of the core dies 920 may be variously changed. The core dies 920 may be referred to as memory dies or memory chips.

Each of the first to fourth core dies 921 to 924 may include one or more channels. In FIG. 8, the HBM 120a includes eight channels CH1 to CH8 as each of the first to fourth core dies 921 to 924 includes two channels. For example, the first core die 921 may include first and third channels CH1 and CH3, the second core die 922 may include second and fourth channels CH2 and CH4, the third core die 923 may include fifth and seventh channels CH5 and CH7, and fourth core die 924 may include sixth and eighth channels CH6 and CH8.

The logic die 910 may include an interface circuit 911 which communicates with the host device, and may receive commands/addresses and data from the host device via the interface circuit 911. The host device may transmit commands/addresses and data through bus(es) arranged corresponding to the channel(s) CH1 to CH8, and the buses may be divided by channel, or some of the buses may be shared by at least two channels. The interface circuit 911 may transfer commands/addresses and data to channels through which the host device requests a memory operation or arithmetic processing. According to some example embodiments, each of the core dies 920 or each of the channels may include a processor-in-memory (PIM) circuit.

The host device may provide commands/addresses and data so that at least some of the plurality of calculation tasks or kernels may be performed in the HBM 120a, and arithmetic processing may be performed in the PIM circuit of the channel designated by the host device. As an example, when the received commands/addresses indicate arithmetic processing, the PIM circuit of the channel may perform the arithmetic processing using write data provided from the host device and/or data read from the channel. As another example, when the commands/addresses received via the corresponding channel of the HBM 120a indicate a memory operation, a data access operation may be performed.

According to various example embodiments, each of the channels CH1 to CH8 may include a plurality of banks, and one or more processing elements may be provided in the PIM circuit of each channel. As an example, the number of processing elements in each channel may equal the number of banks, or one processing element may be shared by at least two banks when the number of processing elements is less than the number of banks. The PIM circuit of each channel may execute a kernel offloaded by the host device.

According to various example embodiments, each of the channels CH1 to CH8 may include the row hammer control circuit RHC described with reference to FIGS. 1 to 7. Since the number of refresh operations may be adjusted differently according to the low hammer information of the memory device, it is possible to determine and cope with the situation in which there is a possibility of actual data loss in the memory device, and it is also possible to reduce the power consumption of the memory system.

The logic die 910 may further include a through silicon via (TSV) region 912, an HBM physical layer interface (HBM PHY) region 913, and a serializer/deserializer (SERDES) region 914. The TSV region 912 is or includes a region in which TSVs for communication with the core dies 920 are formed, and is or includes a region in which bus(es) arranged corresponding to the channel(s) CH1 to CH8 are formed. When each of the channels CH1 to CH8 has a bandwidth of 128 bits, the TSVs may include components for inputting/outputting data of 1024 bits.

The HBM PHY region 913 may include a plurality of input/output circuits for communication with the memory controller 112 and the channels CH1 to CH8, and, as an example, the HMB PHY region 913 may include one or more interconnect circuits for connecting the memory controller 112 and the channels CH1 to CH8. The HBM PHY region 913 may include a physical or electrical layer and a logical layer provided for signals, frequency, timing, driving, detailed operating parameters and functionality required for efficient communication between the memory controller 112 and the channels CH1 to CH8 The HBM PHY region 913 may perform memory interfacing such as selecting a row and a column corresponding to a memory cell for a corresponding channel, writing data to a memory cell, or reading written data. The HBM PHY region 913 may support features of the HBM protocol of the JEDEC standard.

The SERDES region 914 is a region that provides the SERDESS interface of the JEDEC standard as the processing throughput of the processor(s) of the host device increases, and as the demands on memory bandwidth increase. The SERDES region 914 may include one or more of a SERDES transmitter portion, a SERDES receiver portion, and a controller portion. The SERDES transmitter portion may include a parallel-to-serial circuit and a transmitter, receive parallel data streams, and serialize the received parallel data streams. The SERDES receiver portion may include a receiver amplifier, an equalizer, a clock and data recovery circuit, and a serial-to-parallel circuit, receive serial data streams, and parallelize the received serial data streams. The controller portion may include registers such as an error detection circuit, an error correction circuit, and a first in first out (FIFO).

Figure 9:
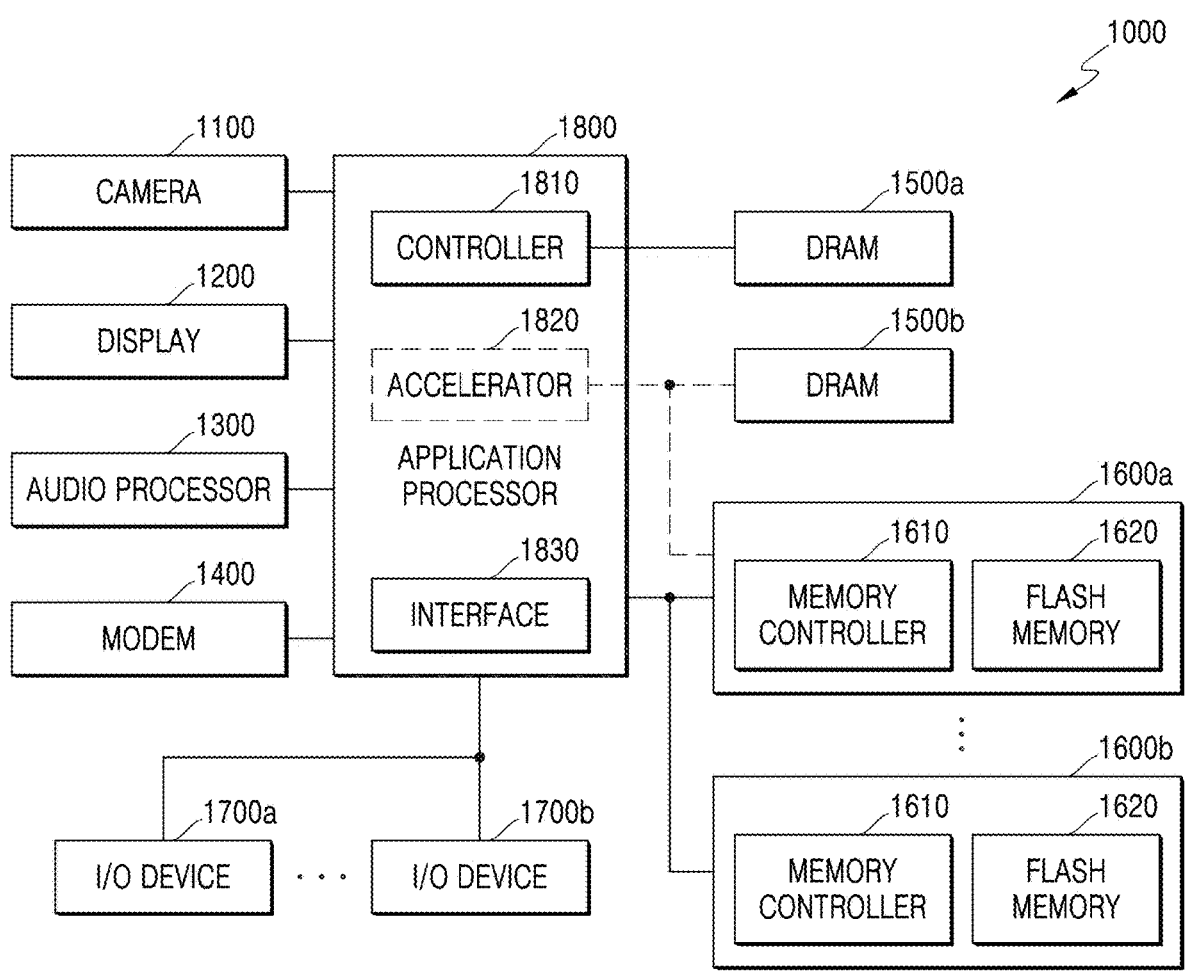
FIG. 9 is a block diagram of a system including a row hammer circuit according to some example embodiments.

FIG. 9 is a block diagram of a system including a row hammer circuit according to some example embodiments.

Referring to FIG. 9, the system 1000 may include a camera 1100, a display 1200, an audio processor 1300, a modem 1400, DRAMs 1500a and 1500b, flash memories 1600a and 1600b, I/O devices 1700a and 1700b, and an application processor 1800 (hereinafter referred to as "AP"). The system 1000 may be implemented as or be included in one or more of a laptop computer, a mobile phone, a smart phone, a tablet personal computer (PC), a wearable device, a healthcare device, or an Internet Of Things (IOT) device. In addition, the system 1000 may also be implemented as a server, and/or a personal computer.

The camera 1100 may capture a still image or a moving image under user control, and store or transmit the captured image/video data to the display 1200. The audio processor 1300 may process audio data included in the contents of the flash memories 1600a and 1600b or the network. The modem 1400 may modulate and transmit a signal for wired/wireless data transmission and reception, and the receiving side may demodulate and recover the original signal. The I/O devices 1700a and 1700b may include devices that provide digital input and/or output functionality, such as a universal serial bus (USB) or storage, a digital camera, a secure digital (SD) card, a digital versatile disc (DVD), a network adapter, a touch screen, and the like.

The AP 1800 may control up to the overall operation of the system 1000. The AP 1800 may control the display 1200 such that a portion of the content stored in the flash memories 1600a and 1600b is displayed on the display 1200. When a user input is received via the I/O devices 1700a and 1700b, the AP 1800 may perform a control operation corresponding to the user input. The AP 1800 may include an accelerator block, which is a dedicated circuit for artificial intelligence (AI) data calculation, and/or may include an accelerator chip 1820 separately from the AP 1800. The DRAM 1500b may be additionally or optionally mounted on the accelerator block or the accelerator chip 1820. As a functional block specialized in performing particular functions of the AP 1800, the accelerator may include one or more of a graphics processing unit (GPU) which is a functional block specialized in graphic data processing, a neural processing unit (NPU) which is a block specialized in AI calculations and inference, and a data processing unit (DPU) which is a block specialized in data transmission.

The system 1000 may include a plurality of DRAMs 1500a and 1500b. The AP 1800 may control the DRAMs 1500a and 1500b through command and mode register (MRS) settings that conform to the JEDEC standard, or communicate with the DRAMs 1500a and 1500 by setting DRAM interface rules to use company-specific functions such as one or more of low voltage/high speed/reliability and cyclic redundancy check (CRC)/error correction code (ECC) functions. For example, the AP 1800 may communicate with the DRAM 1500a through an interface conforming to the JEDEC standard such as LPDDR4 and LPDDR5, and the accelerator block or accelerator chip 1820 may communicate with the DRAM 1500a by setting a new DRAM interface protocol to control the DRAM 1500b for the accelerator having a higher bandwidth than the DRAM 1500a.

Although only the DRAMs 1500a and 1500b are shown in FIG. 9, any memory such as one or more of PRAM, static random access memory (SRAM), MRAM, ReRAM, FeRAM, or Hybrid RAM may be used as long as the bandwidth, reaction speed, and voltage conditions of the AP 1800 or the accelerator chip 1820 are satisfied. The DRAMs 1500a and 1500b have relatively less latency and bandwidth than the I/O devices 1700a and 1700b or the flash memories 1600a and 1600b. The DRAMs 1500a and 1500b may be initialized when the system 1000 is powered on, and may be used as temporary storage locations for the operating system and application data or as execution spaces for various software codes as the operating system and application data are loaded.

In the DRAMs 1500a and 1500b, one or more operations such as addition/subtraction/multiplication/division operations, vector operations, address operations, or fast Fourier transform (FFT) operations may be performed. Alternatively or additionally, a function for execution used for inference may be performed within the DRAMs 1500a and 1500b, wherein the inference may be performed in a deep learning algorithm using an artificial neural network. The deep-learning algorithm may include a training stage of learning a model through various data and an inference stage of recognizing data with the learned model. As some example embodiments, an image captured by a user through the camera 1100 may be signal-processed and stored in the DRAM 1500b, and the accelerator block or accelerator chip 1820 may perform AI data calculation for recognizing data using data stored in the DRAM 1500b and a function used for inference.

The system 1000 may include a plurality of storages or a plurality of flash memories 1600a and 1600b having a capacity greater than the DRAMs 1500a and 1500b. The accelerator block or accelerator chip 1820 may perform the training stage and AI data calculation using the flash memory devices 1600a and 1600b. In some example embodiments, the flash memories 1600a and 1600b may more efficiently perform inference AI data calculation and the training stage performed by the AP 1800 and/or the accelerator chip 1820 using a computing device included in the memory controller 1610. The flash memories 1600a and 1600b may store images captured through the camera 1100, or may store data transmitted through a data network. For example, augmented reality/virtual reality, high definition (HD), or ultra-high definition (UHD) content may be stored.

In the system 1000, the DRAMs 1500a and 1500b may include the row hammer control circuit described with reference to FIGS. 1 to 8. Since the number of refresh operations may be adjusted differently according to the low hammer information of the memory device, it is possible to determine and cope with the situation in which there is a possibility of actual data loss in the memory device, and it is also possible to reduce the power consumption of the memory system.

Figure 10:
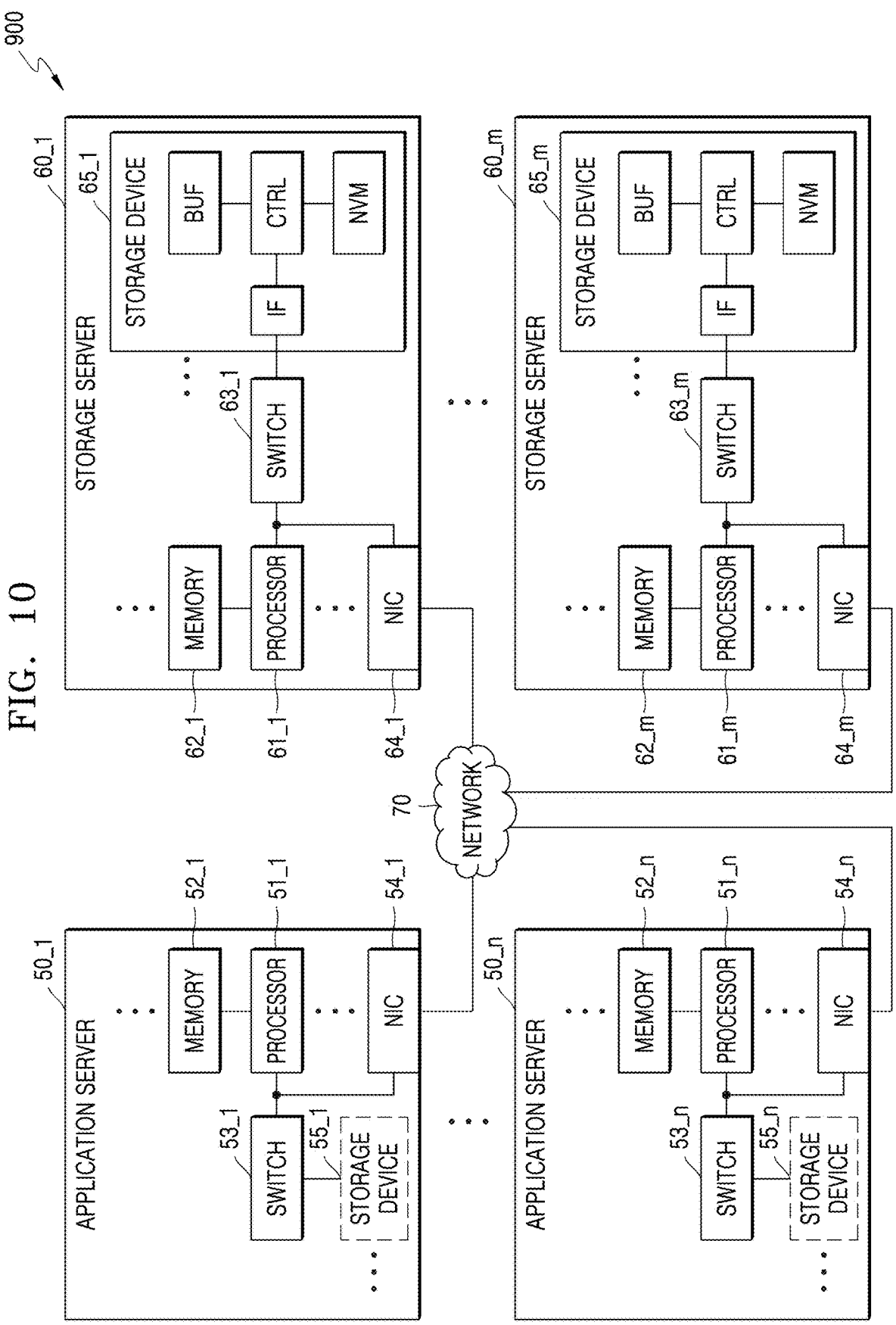
FIG. 10 is a block diagram of a data center including a system according to some example embodiments.

FIG. 10 is a block diagram of a data center 900 including a system according to some example embodiments.

In some example embodiments, the memory device or memory system described above with reference to the figures may be included in an application server and/or a storage server of the data center 900.

Referring to FIG. 10, the data center 900 may collect various data and provide services, and may be referred to as a data storage center. For example, the data center 900 may be a system for operating a search engine and a database, or may be a computing system used in companies such as banks or government agencies. As shown in FIG. 10, the data center 900 may include application servers 50_1 to 50_n and storage servers 60_1 to 60_m (m and n are integers greater than 1). The number n of application servers 50_1 to 50_n and the number m of storage servers 60_1 to 60_m may be variously selected according to some example embodiments, and the number n of application servers 50_1 to 50_n may be different from the number m of storage servers 60_1 to 60_m.

The application servers 50_1 to 50_n may include at least one of processors 51_1 to 51_n, memories 52_1 to 52_n, and switches 53_1 to 53_n, network interface controllers (NICs) 54_1 to 54_n, and storage devices 55_1 to 55_n. The processors 51_1 to 51_n may control overall operations of the application servers 50_1 to 50_n, and may access the memories 52_1 to 52_n to execute instructions and/or data loaded into the memories 52_1 to 52_n. The memories 52_1 to 52_n may include, but are not limited to, one or more of double data rate synchronous DRAM (DDR SDRAM), high bandwidth memory (HBM), hybrid memory cube (HMC), dual in-line memory module (DIMM), Optane DIMM, or non-volatile DIMM (NVDIMM)

According to some example embodiments, the number of processors and/or the number of memories included in the application server 50_1 to 50_n may be variously selected.

In some example embodiments, the processors 51_1 to 51__n_ and the memories 52_1 to 52__n_ may provide a processor-memory pair. In some example embodiments, the number of the processors 51_1 to 51__n_ may be different from the number of the memories 52_1 to 52__n_. The processors 51_1 to 51__n_ may include single-core processors and/or multi-core processors. In some example embodiments, storage devices 55_1 to 55__n_ in the application servers 50_1 to 50__n_ may be omitted, as shown by dashed lines in FIG. 10. The number of storage devices 55_1 to 55__n_ included in the application servers 50_1 to 50__n_ may be variously selected according to some example embodiments. The processors 51_1 to 51__n_, the memories 52_1 to 52__n_, the switches 53_1 to 53__n_, the NICs 54_1 to 54__n_, and the storage devices 55_1 to 55__n_ may communicate with each other via links described above with reference to the figures.

The storage servers 60_1 to 60__m_ may include at least one of the processors 61_1 to 61__m_, the memories 62_1 to 62__m_, the switches 63_1 to 63__m_, the NICs 64_1 to 64__m_, and the storage devices 65_1 to 65__m_. The processors 61_1 to 61__m_ and memories 62_1 to 62__m_ may operate similarly to the processors 51_1 to 51__n_ and the memories 52_1 to 52__n_ of the application servers 50_1 to 50__n_ described above.

The memories 52_1 to 52__n_ and the memories 62_1 to 62__m_ included in the application servers 50_1 to 50__n_ and the storage servers 60_1 to 60__m_, respectively, may include memory devices according to some example embodiments described above. For example, the memories 52_1 to 52__n_ and 62_1 to 62__m_ may include a volatile memory device, such as DRAM, and based on an operation of counting the number of actives of word lines and an operation of counting the number of outputs performed on a register including a plurality of entries, an operation of generating row hammer information and an RFM command according to some example embodiments may be performed. Since the number of refresh operations may be adjusted differently according to the row hammer information of the memories 52_1 to 52__n_ and 62_1 to 62__m_, it is possible to determine and cope with a situation in which there is a possibility of actual data loss in the memory device, and it is also possible to reduce power consumption of the memory system.

The application servers 50_1 to 50__n_ may communicate with the storage servers 60_1 to 60__m_ over a network 70. In some example embodiments, the network 70 may be implemented using fibre channel (FC) or Ethernet, etc. The FC may be a medium used for relatively high-speed data transmission, and an optical switch providing high performance/high availability may be used. Depending on the access scheme of the network 70, the storage servers 60_1 to 60__m_ may be provided as file storage, block storage, or object storage.

In some example embodiments, the network 70 may be or may include or be included in a storage-only network such as a storage area network (SAN). For example, the SAN may use an FC network and may be an FC-SAN implemented according to the FC protocol (FCP). Alternatively, the SAN may be or may include or be included in an IP-SAN using a TCP/IP network and implemented according to the iSCSI (SCSI over TCP/IP or Internet SCSI) protocol. In some example embodiments, the network 70 may be a general network such as a TCP/IP network. For example, the network 70 may be implemented according to one or more protocols such as FC over Ethernet (FCoE), network attached storage (NAS), NVMe over fabrics (NVMe-oF), etc.

Hereinafter, the application server 50_1 and the storage server 60_1 are mainly described, but it is noted that the description of the application server 50_1 may also be applied to another application server (e.g., 50__n_), and the description of the storage server 60_1 may also be applied to another storage server (e.g., 60__n_).

The application server 50_1 may store data requested for storage by a user or a client in one of the storage servers 60_1 to 60__m_ via the network 70. In addition, the application server 50_1 may acquire data requested to be read by a user or a client from one of the storage servers 60_1 to 60__m_ via the network 70. For example, the application server 50_1 may be implemented as a web server or a database management system (DBMS).

The application server 50_1 may access the memory 52__n_ and/or the storage device 55__n_ included in another application server 50__n_ via the network 70, and/or may access the memories 62_1 to 62__m_ and/or the storage devices 65_1 to 65__m_ included in the storage servers 60_1 to 60__m_ via the network 70. Accordingly, the application server 50_1 may perform various operations on data stored in the application servers 50_1 to 50__n_ and/or the storage servers 60_1 to 60__m_. For example, the application server 50_1 may execute a command for moving or copying data between the application servers 50_1 to 50__n_ and/or the storage servers 60_1 to 60__m_. The data may then be transferred from the storage devices 65_1 to 65__m_ of the storage servers 60_1 to 60__m_ to the memories 52_1 to 52__n_ of the application servers 50_1 to 50__n_ either directly or via the memories 62_1 to 62__m_ of the storage servers 60_1 to 60__m_. In some example embodiments, data traveling via the network 70 may be encrypted for security or privacy.

In the storage server 60_1, an interface IF may provide a physical connection between the processor 61_1 and the controller CTRL and a physical connection between the NIC 64_1 and the controller CTRL. For example, the interface IF may be implemented in a direct attached storage (DAS) method that directly connects the storage device 65_1 with a dedicated cable. In addition, for example, the interface IF may be implemented in a variety of interface schemes, such as one or more advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), compact flash (CF) card interface, etc.

In the storage server 60_1, the switch 63_1 may selectively connect the processor 61_1 to the storage device 65_1, or may selectively connect the NIC 64_1 to the storage device 65_1, under the control of the processor 61_1.

In some example embodiments, the NIC 64_1 may include a network interface card, a network adapter, and the like. The NIC 64_1 may be connected to the network 70 via one or more of a wired interface, a wireless interface, a Bluetooth interface, an optical interface, etc. The NIC 64_1 may include one or more of an internal memory, a DSP, a host bus interface, etc., and may be connected to the processor 61_1 and/or the switch 63_1, etc., via the host bus interface. In some example embodiments, the NIC 64_1 may be integrated with at least one of the processor 61_1, the switch 63_1, and the storage device 65_1.

In the application servers 50_1 to 50__n_ or the storage servers 60_1 to 60__m_, the processors 51_1 to 51__m_ and 61_1 to 61__n_ may program and/or read data by transmitting commands to the storage devices 55_1 to 55__n_ and 65_1 to 65__m_ or the memories 52_1 to 52__n_ and 62_1 to 62__m_. The data may be error-corrected data through the ECC engine. The data, subjected to data bus inversion (DBI) and/or data masking (DM) processing, may include CRC information. The data may be encrypted data for security or privacy.

In response to read commands received from the processors 51_1 to 51_m and 61_1 to 61_n, the storage devices 55_1 to 55_n and 65_1 to 65_m may transmit control signals and command/address signals to a non-volatile device NVM (e.g., NAND flash memory device). Accordingly, when data is read from the non-volatile memory device NVM, a read enable signal may be input as a data output control signal and output data to a DQ bus. A data strobe signal may be generated using the read enable signal. The command and address signals may be latched according to a rising edge or a falling edge of a write enable signal.

The controller CTRL may generally control the operation of the storage device 65_1. In some example embodiments, the controller CTRL may include SRAM. The controller CTRL may write data into the nonvolatile memory device NVM in response to a write command, or may read data from the nonvolatile memory device NVM in response to a read command. For example, the write command and/or the read command may be generated based on a request from a host, e.g., the processor 61_1 in the storage server 60_1, the processor 61_m in another storage server 60_m, or the processors 51_1 to 51_n in the application servers 50_1 to 50_n. A buffer BUF may temporarily store (buffer) data to be written in the non-volatile memory device NVM or data read from the non-volatile memory device NVM. In some example embodiments, the buffer BUF may include DRAM. In addition, the buffer BUF may store metadata, and the metadata may refer to user data or data generated by the controller CTRL to manage the non-volatile memory device NVM. The storage device 65_1 may include a secure element (SE) for security or privacy.

Any or all of the elements described with reference to the figures may communicate with any or all other elements described with reference to the respective figures. For example, any element may engage in one-way and/or two-way and/or broadcast communication with any or all other elements, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Furthermore, any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Additionally although in some figures some functions are described as being performed by one or more elements, example embodiments are not necessarily limited thereto. For example, in some example embodiments various functions may be performed wholly or at least partially by other elements described within the various figures.

While inventive concepts have been particularly shown and described with reference to some example embodiments thereof, it will be understood that various changes in form and details may be made therein without departing from the spirit and scope of the following claims. Furthermore, example embodiments are not necessarily mutually exclusive with one another. For example, some example embodiments may include one or more features described with reference to one or more figures and may also include one or more features described with reference to one or more other figures.

What is claimed is:

1. A memory controller configured to communicate with a memory device including a memory cell array that includes a plurality of word lines, the memory controller comprising:
   a scheduler configured to control commands provided to the plurality of word lines;
   an error correction code (ECC) engine having a register including N entries and configured to store, in the register, a first parameter which includes address information and active number information of N word lines from among the plurality of word lines based on counting the number of actives of the plurality of word lines;
   a comparator configured to compare the first parameter with a threshold parameter; and
   a refresh management (RFM) decision circuit configured to determine a refresh frequency of the plurality of word lines based on results output from the comparator and to generate an RFM command.

2. The memory controller of claim 1, wherein the ECC engine comprises a counter configured to generate the first parameter by counting the number of actives of the plurality of word lines.

3. The memory controller of claim 1, wherein the RFM decision circuit is configured to generate the RFM command in response to the first parameter being greater than the threshold parameter.

4. The memory controller of claim 3, wherein the refresh frequency increases as the number of actives of the plurality of word lines increases.

5. The memory controller of claim 4, wherein refresh operations of the plurality of word lines increase as the refresh frequency increases.

6. The memory controller of claim 1, wherein the scheduler is configured to provide the RFM command generated by the RFM decision circuit to the memory device.

7. The memory controller of claim 1, wherein the memory controller is configured to operate such that a period for providing the RFM command is changed based on the refresh frequency.

8. The memory controller of claim 1, wherein the memory controller is configured to operate such that the first parameter output by the ECC engine decreases as the RFM command is generated.

9. A method of operating a memory controller which communicates with a memory device including a memory cell array that includes a plurality of word lines, the method comprising:
   storing a first parameter which includes address information and active number information of N word lines from among the plurality of word lines based on counting the number of actives of the plurality of word lines;

comparing the first parameter with a threshold parameter;

determining refresh frequency of the plurality of word lines based on a result of the comparing; and generating a refresh management (RFM) command based on the refresh frequency.

10. The method of claim 9, wherein the storing of the first parameter comprises:

generating the first parameter by counting the number of actives of the plurality of word lines.

11. The method of claim 9, wherein the generating of the RFM command comprises:

generating the RFM command when the first parameter is greater than the threshold parameter.

12. The method of claim 11, further comprising:

increasing the refresh frequency as the number of actives of the plurality of word lines increases.

13. The method of claim 12, wherein refresh operations of the plurality of word lines increase as the refresh frequency increases.

14. The method of claim 9, further comprising:

providing the generated RFM command to the memory device.

15. The method of claim 9, further comprising:

changing a period of providing the RFM command, based on the refresh frequency.

16. The method of claim 9, further comprising:

decreasing the first parameter output by an ECC engine as the RFM command is generated.

17. A memory controller configured to communicate with a plurality of memory devices, the memory controller comprising:

a scheduler configured to control commands provided to the plurality of memory devices;

an error correction code (ECC) engine having a register including N entries and configured to store, in the register, a first parameter which includes address information and active number information of N memory devices among the plurality of memory devices based on counting the number of actives of the plurality of memory devices;

a comparator configured to compare the first parameter with a threshold parameter; and a refresh management (RFM) decision circuit configured to determine refresh frequency of the plurality of memory devices based on results output from the comparator and to generate an RFM command.

18. The memory controller of claim 17, wherein the RFM decision circuit is configured to generate an RFM command in response to the first parameter being greater than the threshold parameter, and the refresh frequency increases as the number of actives of the plurality of memory devices increases.

19. The memory controller of claim 17, wherein the scheduler is configured to provide the RFM command generated by the RFM decision circuit, to at least one memory device.

20. The memory controller of claim 17, wherein a period for providing the RFM command is configured to be changed based on the refresh frequency.

* * * * *